United States Patent Office 3,288,559
Patented Nov. 29, 1966

3,288,559
THIOCYANATE EXTRACTION OF BERYLLIUM
Wendell J. Biermann, Winnipeg, Manitoba, Canada, assignor to Beryloy Limited (no personal liability), Winnipeg, Manitoba, Canada
No Drawing. Filed June 4, 1962, Ser. No. 199,663
15 Claims. (Cl. 23—19)

This invention relates to improvements in the art of recovering beryllium and more particularly to a process for the solvent extraction of beryllium (in the form of a utilizable compound) from aqueous solutions.

While the greatest efforts concerning the chemical metallurgy of beryllium in the past have been directed toward the processing of beryl to produce beryllium oxide for use for example as a ceramic oxide or for production of a beryllium copper alloy, new types of mineralization extensive and rich enough in beryllium to be more attractive than the traditional hand cobbed beryl, provided the beryllium can be extracted, have led to extensive efforts to improve the known methods of extraction. In addition the requirements of the nuclear energy field have also necessitated a purity in the extracted beryllium not heretofor demanded.

The naturally occurring mineralization containing beryllium can always be treated in some manner as to bring the beryllium with greater or lesser amounts of other metals, into an aqueous solution. The bringing into solution may be done by any known method as for example by conventional uses of leaching, fusing with fluxes or the like.

It is therefore the object of this invention to provide an economical and effective process which can be readily carried out for the extraction and recovery of beryllium from an aqueous beryllium containing solution which also contains other metals to a greater or lesser degree.

Another important object is to provide a process as aforesaid which will enable beryllium having a high degree of purity to be obtained.

Still another important object is to enable beryllium to be extracted with relatively inexpensive reagents and solvents.

Again a very important object is to provide a process as aforesaid in which substantially full recovery of the reagents and solvents used can be effected economically.

According to the invention it has been discovered that if thiocyanate ion is added to a beryllium containing aqueous solution as for example by the addition of ammonium thiocyanate and the pH of the solution be set at a selected level, effective selective extraction of beryllium can be achieved through the use of suitable organic solvents, for example solvents containing oxygen, either as hydroxyl or double bonded, as in carbonyl, and generally containing no fewer than four, or more than eight or ten, carbon atoms.

Further it has been found that in the process the extracted beryllium can be readily stripped from the solvent as for example by a dilute ammonia solution, the stripping effecting complete removal of the beryllium so that the organic solvent can be reused with no further treatment.

Still further the invention affords further economies in that excess thiocyanate not used up in the complexing with the beryllium (and other metals present) can be recovered by solvent extraction identical to the solvent extraction of the beryllium except that the extraction process is carried out at a lower pH.

The extraction of beryllium has given rise to many long standing problems, a notable one being to provide selectivity particularly between beryllium and the very similar aluminum which nearly always is present along with beryllium in naturally occurring ores or mineralization. Characteristic of beryllium is the high ionic charge to radius ratio of beryllium ion which permits the formation of a wide variety of coordination compounds. I have found that those compounds which include a total net negative charge of two units among the ligands, or which are capable of forming "ion pairs" in significant concentrations, are potentially useful as the bases of solvent extraction systems for removal of beryllium ion from water solution. Of such ligands, those that provide selectivity in separating beryllium from other metal ions of inert gas configuration by liquid-liquid extraction, the essential requirement for a useful process, are easily polarizable, monofunctional ligands. One such specific ligand which has been found to be of particular utility in the selective extraction of beryllium is the thiocyanate ion.

In this connection the thiocyanate ion can be conveniently and economically introduced into an aqueous beryllium containing solution by the addition of an appropriate amount of ammonium thiocyanate, preferably in the amount of about 1.5 to 2.0 moles per liter, as hereinafter discussed.

In addition I have found that certain organic solvents play an active role in the selective extraction of the coordination compound beryllium thiocyanate formed by the addition of the ammonium thiocyanate. The organic solvents which have been found to be particularly effective with low solvent loss are ketone or hydroxy groups on chains containing approximately six to eight carbons.

In carrying out the extraction process to give effective selectivity I have discovered that the pH of the beryllium containing aqueous solution is an important governing factor, the pH of the solution preferably being adjusted as by the addition of sulphuric acid to a value of about 2.0 to 3.0 as hereinafter discussed.

To illustrate the fact that the solvents enter into the chemistry of extraction in addition to supplying a medium for physical solution, reference is to be had to Table 1 which shows the distribution ratios between the organic and aqueous phases of beryllium and aluminum ions in the presence of thiocyanate ion for various organic phases. As noted, because of the great similarity existing between beryllium and aluminum compounds and their common occurrence together, separation of this pair of metals is used as a criterion of the selectivity of beryllium extraction by a given solvent.

In the examples given in Table 1 the initial concentration of metal in the aqueous phase was 0.100 M, of the thiocyanate ion 3.0 M as ammonium thiocyanate, and the pH was 3.00±0/.01. The selection of the level of thiocyanate ion concentration and pH for the examples of Table 1 were determined by means of the examples of Tables 2 and 3 hereinafter discussed.

TABLE 1

| Organic Solvent | Distribution Ratio | |
|---|---|---|
| | Aluminum | Beryllium |
| Alcohols: | | |
| Cyclohexanol | 3.0 | 6.70 |
| n-Amyl alcohol | 0.701 | 3.27 |
| Isoamyl alcohol | 0.673 | 4.55 |
| Methyl amyl alcohol | 0.145 | 2.03 |
| 1-hexanol | 0.770 | 2.59 |
| 2-ethylhexanol | 0.30 | 0.49 |
| 1-octanol | 0.513 | 1.66 |
| 2-octanol | 0.089 | 1.28 |
| Thioalcohols: | | |
| Lauryl mercaptan | | 0.004 |
| Octyl mercaptan | | 0.000 |
| Hexyl mercaptan | | 0.030 |
| Esters: | | |
| Ethyl acetate | 0.256 | 1.27 |
| Amyl acetate | 0.012 | 0.115 |
| Isoamyl acetate | 0.183 | 1.22 |
| Octyl acetate (2-ethylhexyl acetate) | 0.000 | 0.77 |
| 2-ethyl butyl acetate | 0.008 | 0.89 |
| Ketones: | | |
| Methyl isobutyl ketone | 0.122 | 2.38 |
| Acetophenone | 0.103 | 2.37 |
| Methyl isopropyl ketone | | 4.87 |
| Methyl n-amyl ketone | 0.110 | 1.63 |
| 2,4-dimethyl pentanone | 0.005 | 0.138 |
| Aldehydes: | | |
| Paraldehyde | | 0.235 |
| Paraldehyde (2 M kerosene solution) | | 0.11 |
| Butyraldehyde | 0.161 | 2.5 |
| Butyraldehyde (2 M in kerosene) | 0.075 | 0.64 |
| Acetaldehyde (4 M in kerosene) | | 0.51 |
| Ethers: | | |
| Butyl ether | 0.000 | 0.000 |
| Isopropyl ether | | 0.000 |

From the foregoing Table 1 it will be seen that the solvents which provide a high distribution ratio of beryllium as compared to aluminum, that is, that provide effective selective extraction of beryllium, are solvents which are most highly polar in nature, notably the alcohols and ketones.

That is, Table 1 establishes that the highly polar solvents interact chemically with the thiocyanate complex in such a manner as to provide beryllium extraction selectivity. While such selectivity might not be as effective with respect to cations of "non-inert gas configurations" specifically the elements near and just past the ends of the transitional series of the periodic table, this possibility has no practical significance since elements of this latter type are not found, certainly not in quantity, associated with beryllium in nature. In the event traces of these elements are present they can be readily separated out.

The analogous less highly polar sulphur compounds are shown to be poor extraction solvents indicating that the chemical interaction of the solvent is through its oxygen.

In general therefore with respect to the solvents, double bonded and hydroxyl oxygens are shown to be associated with high distribution coefficients in effecting solvent extraction. These groups of solvents are most effective when attached to short hydrocarbon chains, but since the short chains are also associated with greater solubility in water, there comes a point where solvent losses impair the economy of the extraction process.

In the light of these factors therefore the most practical solvents comprise solvents with ketone groups associated with five or six carbon atoms, or hydroxyl groups associated with six to eight carbon atoms. With solvent costs taken into consideration, methyl isobutyl ketone, 1-hexanol, 2-octanol, and isoamyl acetate are particularly useful.

To illustrate the effect of varying pH in the selective extraction of beryllium reference is to be had to Table 2. In establishing the results in Table 2 the concentration of thiocyanate was kept at 2.0 molar for all extractions except the extraction of aluminum into 1-hexanol, in which case the concentration of ammonium thiocyanate was 2.5 moles per liter. The initial metal concentration was uniformly 0.10 moles per liter.

TABLE 2.—THE EXTRACTION OF BERYLLIUM AND ALUMINUM FROM AQUEOUS THIOCYANATE SOLUTIONS, AS A FUNCTION OF pH

| pH | Solvent | | | | | |
|---|---|---|---|---|---|---|
| | 1-hexanol | | MIK* | | Isoamyl Acetate | |
| | Be | Al | Be | Al | Be | Al |
| 0.5 | 20.4 | | 11.6 | 3.7 | 6.8 | |
| 1.0 | 39.7 | 15.6 | 34.5 | 12.3 | 21.7 | 10.9 |
| 2.0 | 55.3 | 27.7 | 45.4 | 18.3 | 29.9 | 15.3 |
| 3.0 | 54.2 | 28.6 | 42.3 | 22.8 | 30.8 | |
| 4.0 | 26.3 | | 30.7 | | 11.3 | |
| 5.0 | 11.0 | | 1.8 | | 1.1 | |

*Methyl isobutyl ketone.

From the results of Table 2 it is seen that the extraction is most efficient or selective with a pH of 2 to 3.

It appears that the protons (approximately "acidity") present in the aqueous phase plays a double role; too high a concentration of protons lowers the thiocyanate ion concentration through formation of thiocyanic acid, and a low proton concentration decreases extraction of beryllium, presumably through formation or non-extractable species such as $BeOH^+$.

Table 3 illustrates the effect of variation of thiocyanate concentration on the extraction of beryllium and aluminum using aqueous solutions having an initial metal concentration of 0.100 M and a pH of 3.00. The aqueous layers were extracted with an equal volume of the indicated organic solvent and the water layer was analyzed after extraction to find the amount of metal which had been removed. It was noted that the extraction was very rapid.

TABLE 3.—EXTRACTION OF BERYLLIUM AND ALUMINUM AS A FUNCTION OF AMMONIUM THIOCYANATE CONCENTRATION

| Thiocyanate concentration moles/liter | Percentage Extraction Using— | | | | | | | |
|---|---|---|---|---|---|---|---|---|
| | MIK* | | Isoamyl Acetate | | 1-hexanol | | 2-octanol | |
| | Be | Al | Be | Al | Be | Al | Be | Al |
| 0.5 | 2.9 | 9.2 | 7.1 | 0.0 | 8.0 | 0.0 | 2.3 | 0.0 |
| 1.0 | 14.4 | 1.1 | 6.9 | 0.3 | 23.6 | 0.1 | 10.9 | 0.0 |
| 1.5 | 29.4 | 1.6 | 4.5 | 0.8 | 41.8 | 9.0 | 21.9 | 1.5 |
| 2.0 | 43.2 | 3.7 | 20.1 | 2.2 | 52.3 | 19.3 | 34.1 | 1.0 |
| 2.5 | 59.3 | 7.0 | 29.6 | 3.2 | 64.8 | 30.8 | 43.9 | 4.7 |
| 3.0 | 67.7 | 12.7 | 44.1 | 10.9 | 72.1 | 41.2 | 56.1 | 10.3 |
| 4.0 | 78.8 | | | | 83.0 | | | |
| 5.0 | 83.1 | | | | 88.7 | | | |
| 6.0 | 85.1 | | | | 91.5 | | | |
| 7.0 | 86.6 | | | | 94.5 | | | |

*Methyl isobutyl ketone.

From Table 3 it will be seen that the selectivity of the extraction process using the solvents set out in optimum with the thiocyanate concentration set at about 1.5 M.

In order for the process to be of noteworthy economy, it is necessary to be able to remove the beryllium easily from the solvent. This it has been found can be easily done by stripping with an alkaline solution, for example dilute ammonia solution, with consequent complete removal of the beryllium from the organic solvent, which can be reused with no further treatment. The beryllium is in the form of a beryllium hydroxide precipitate in the water phase, from which it can be filtered and dried.

In addition, either water or dilute sulphuric acid could also be used for stripping in a column.

With repetitive extraction it will be appreciated that the resulting beryllium compound can be obtained with a very high degree of purity, the purity depending on the number of successive equilibrations. The fact that such purity can be achieved using the extraction process as above described is one of the most important aspects of the invention.

A further important aspect of the invention adding to the economy of the extraction process according to the invention is the ease and economy with which excess thiocyanate is recovered. Such recovery of the excess thiocyanate is effected by a solvent extraction technique identical to the solvent extraction of beryllium except that it takes place at lower pH.

Table 4, below, shows the percentage extraction of thiocyanate ion into several typical solvents over a pH range. It is extracted in the form of thiocyanic acid, which is reconverted to ammonium thiocyanate by extracting from the organic phase with ammonia water.

In this connection, we have found that it is perfectly feasible to reuse the ammonium thiocyanate solution several times by simply recharging it with a new batch of impure beryllium solution, following an extraction cycle.

TABLE 4.—EXTRACTION OF THIOCYANATE WITH VARYING pH

| pH | Percentage Extraction In— | | |
|---|---|---|---|
| | 1-hexanol | 2-octanol | MIK* |
| 0.3 | 51.0 | 51.4 | |
| 0.6 | 34.3 | 29.4 | 40.2 |
| 1.0 | 12.2 | 3.4 | 13.4 |
| 2.0 | 4.7 | 2.8 | 7.3 |
| 3.0 | 5.7 | 1.8 | 5.6 |
| 4.0 | 2.6 | 0.7 | 4.2 |
| 5.0 | 2.2 | 0.4 | 2.0 |

*Methyl isobutyl ketone.

While the above examples were conducted with a metal concentration in the aqueous solution of 0.100 M, it has been found that the distribution coefficient in the solvent extraction step is independent of metal concentration over a wide range.

Again while the examples specify the use of ammonium thiocyanate, sodium, potassium, or other thiocyanate can be used to produce comparable results although at present the relative costs of other thiocyanates as compared to ammonium thiocyanate renders the latter far more practicable.

From the foregoing examples and illustrations it will be apparent that effective beryllium extraction can be achieved by introducing thiocyanate ion to an aqueous beryllium containing solution, for example by adding ammonium thiocyanate in the amount of about 1.5 moles per liter with the pH of the solution adjusted by the addition of sulphuric acid to a value of about 2.0 to 3.0, and then extracting the beryllium by a suitable solvent characterized by containing oxygen, either as hydroxyl or double bonded, as in carbonyl, and generally containing substantially no fewer than four, or substantially more than eight to ten carbon atoms. Again it will be understood that the purity of the extracted beryllium compound can be selected by varying the number of equilibrations.

The extracted beryllium complex can then be stripped from the beryllium rich organic phase as for example by dilute ammonia leaving the organic phase ready for immediate re-use. The aqueous phase can also be easily stripped of excess thiocyanate to provide a highly efficient and economical process.

In practice, in carrying out the invention the process may conveniently comprise a two solvent countercurrent extraction process with the extraction solvent being selected for example from one of the groups 1-hexanol, methyl isobutyl ketone, isoamyl acetate, and 2-octanol and the wash solvent comprising a suitable ammonium thiocyanate solution such as 2 M adjusted to pH 3 by sulphuric acid.

It will be obvious, however, that the invention may be put into practice in many ways and the examples herein set out are for illustration only and not by way of limitation and various substitutes and changes may be made within the spirit of the invention and without departing from the scope of the appended claims.

For instance, while the use of the process has been particularly described with reference to extracting naturally occurring materials, it will be understood it is equally applicable to increasing the purity of already processed beryllium compounds.

What I claim is:

1. A continuous process for the selective separation of beryllium values from an aqueous solution containing beryllium values obtained from a beryllium ore containing aluminum values comprising the steps of introducing a compound selected from the group consisting of sodium thiocyanate, potassium thiocyanate, and ammonium thiocyanate into said aqueous solution to form beryllium thiocyanate, adjusting the pH value of said solution to a level of substantially 2 to 3, extracting said beryllium thiocyanate with an organic solvent capable of substantial selective extraction of said beryllium thiocyanate and selected from the class consisting of ketones, alcohols, aldehydes and esters, to thereby selectively extract said beryllium thiocyanate and obtain an organic phase rich in beryllium values and an aqueous phase containing substantially the greater portion of said aluminum values and excess thiocyanate, stripping said organic phase of said beryllium values and recovering same and recycling said stripped organic phase, adjusting the pH of said aqueous phase below 2.0 and stripping said excess thiocyanate therefrom with an organic solvent capable of effective extraction of said excess thiocyanate, stripping said last mentioned organic solvent of said excess thiocyanate by extracting same with an alkaline solution containing at least one ion selected from the class consisting of potassium, sodium and ammonium and recycling the recovered thiocyanate.

2. A continuous process for the selective separation of beryllium values from an aqueous solution containing beryllium values obtained from a beryllium ore containing aluminum values, comprising the steps of introducing a compound selected from the group consisting of sodium thiocyanate, potassium thiocyanate, and ammonium thiocyanate into said aqueous solution to form beryllium thiocyanate, adjusting the pH value of said solution to a level of substantially 2 to 3, extracting said beryllium thiocyanate with an organic solvent capable of substantial selective extraction of said beryllium thiocyanate and selected from the class consisting of ketones and alcohols having from substantially four to substantially ten carbon atoms per molecule, to thereby selectively extract said beryllium thiocyanate and obtain an organic phase rich in beryllium values and an aqueous phase containing substantially the greater portion of said aluminum values and excess thiocyanate, stripping said organic phase of said beryllium values and recovering same and recycling said stripped organic phase, adjusting the pH of said aqueous phase below 2.0 and stripping said excess thiocyanate therefrom with an organic solvent capable of effective extraction of said excess thiocyanate, stripping said last mentioned organic solvent of said excess thiocyanate by extracting same with an alkaline solution containing at least one ion selected from the class consisting of potassium, sodium and ammonium and recycling the recovered thiocyanate.

3. A process as claimed in claim 2 in which said thiocyanate compound is introduced into said aqueous solution in a concentration of substantially 1.5 to 2.0 mols per liter.

4. A process according to claim 3 in which the stripping of said organic phase of said beryllium values is effected by means of a dilute ammonia solution.

5. A process according to claim 3 wherein said first mentioned organic solvent is methyl isobutyl ketone.

6. A process according to claim 3 wherein said first mentioned organic solvent is 1-hexanol.

7. A process according to claim 3 wherein said first mentioned organic solvent is 2-octanol.

8. A process according to claim 3 wherein said first mentioned organic solvent is isoamyl acetate.

9. A continuous process according to claim 3 wherein the organic solvent for stripping the excess thiocyanate is selected from the class consisting of 1-hexanol, methyl isobutyl ketone and isoamyl acetate.

10. In the extraction of beryllium values from an aqueous solution containing beryllium values and aluminum values obtained from a beryllium ore containing aluminum values, the steps of introducing a compound selected from the group consisting of sodium thiocyanate, potassium thiocyanate, and ammonium thiocyanate into said aqueous solution to form beryllium thiocyanate, adjusting the pH value of said solution to a level of substantially 2 to 3, extracting said beryllium thiocyanate with an organic solvent capable of substantial selective extraction of said beryllium thiocyanate, said solvent being selected from the class consisting of ketones, alcohols, aldehydes and esters to thereby selectively extract said beryllium thiocyanate and obtain an organic phase rich in beryllium values and an aqueous phase containing substantially the greater portion of said aluminum values, stripping said organic phase of said beryllium values and recovering same.

11. In the extraction of beryllium values as claimed in claim 10 in which said organic solvent is a solvent selected from the class consisting of ketones and alcohols having from substantially four to substantially ten carbon atoms per molecule.

12. In the extraction of beryllium values as claimed in claim 10 in which said organic solvent is methyl isobutyl ketone.

13. In the extraction of beryllium values as claimed in claim 10 in which said organic solvent is 1-hexanol.

14. In the extraction of beryllium values as claimed in claim 10 in which said organic solvent is 2-octanol.

15. In the extraction of beryllium values as claimed in claim 10 in which said organic solvent is isoamyl acetate.

References Cited by the Examiner

UNITED STATES PATENTS 2,227,833  1/1941  Hixson et al. _____ 23—312 X

OTHER REFERENCES

Fischer et al.: "Zeitschrift fur Anorganische and Allgemeine Chemie," vol. 249, 1942, pp. 146 to 197 (pp. 171–188 and 192 of particular interest).

West: "Metallurgia," March 1956, pp. 132–134.

OSCAR R. VERTIZ, *Primary Examiner.*

MAURICE A. BRINDISI, *Examiner.*

H. T. CARTER, *Assistant Examiner.*